Jan. 8, 1935.  H. W. KACHEL  1,987,341
METHOD OF MAKING PIPE JOINTS
Filed July 15, 1931
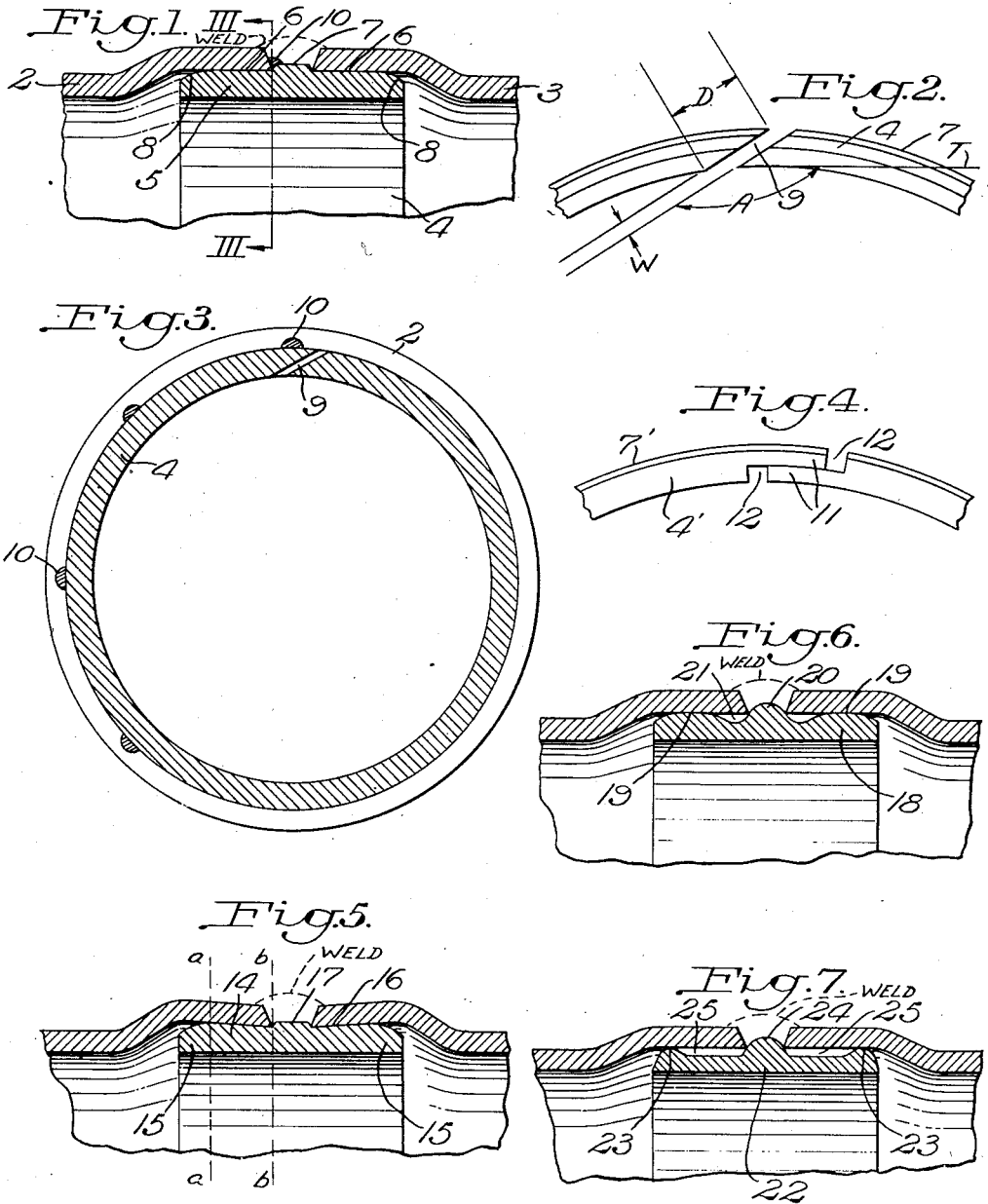
INVENTOR
Henry W. Kachel, Patented Jan. 8, 1935

1,987,341

UNITED STATES PATENT OFFICE 1,987,341

METHOD OF MAKING PIPE JOINTS

Henry W. Kachel, Youngstown, Ohio, assignor to The Youngstown Sheet and Tube Company, Youngstown, Ohio, a corporation of Ohio Application July 15, 1931, Serial No. 550,912

4 Claims. (Cl. 29—148.2)

The present invention relates broadly to the art of interconnecting adjacent sections of conduit, pipe, tubes and the like, and more particularly to the forming of welded joints between adjacent pipe sections.

Considerable difficulty is experienced in the art at the present time in the welding together of adjacent pipe sections or lengths to form a continuous conduit. My invention provides a method of joining pipe sections whereby the welding operation is facilitated and the characteristics of the joint improved. The method of my invention, furthermore, is such that pipe lengths having different internal diameters within the tolerances usually permitted may be readily joined. My method is further characterized by the use of parts which can be readily and cheaply made.

It is to be understood that the term "pipe" or "pipe section" as hereinafter utilized is a term of definition and not one of limitation, and that it includes within its scope metallic conduits of any shape, cross section or length where they are of such nature as to permit of an assembling operation by welding.

In the accompanying drawing there is shown for purposes of illustration only, certain preferred embodiments of the invention. In the drawing:

Figure 1 is a vertical sectional view through a portion of a joint constructed in accordance with the present invention;

Figure 2 is a partial side elevational view of the chill illustrated in Figure 1;

Figure 3 is a vertical sectional view on the line III—III of Figure 1, looking in the direction of the arrows;

Figure 4 is a view similar to Figure 2, illustrating a slightly different form of chill;

Figure 5 is a view similar to Figure 1, illustrating another type of joint; and

Figures 6 and 7 are views similar to Figures 1 and 5 showing still further embodiments of the invention.

Referring first to Figure 1 of the drawing, there is illustrated a portion of a joint formed between a pipe section 2 and a pipe section 3. These pipe sections are herein illustrated as being bell ended, although the invention is equally applicable to either straight or plain pipe sections, or sections of special construction. In accordance with the embodiment of the invention illustrated in Figure 1, a chill 4 is slipped into position in the end of the pipe section 2 to the desired extent. The chill is illustrated as having side portions 5 providing seats 6 conforming to the contour of the inner ends of the pipe sections so as to fit snugly thereagainst. Intermediate the side portions 5 is a rib or abutment 7, the rib herein being illustrated as located at the central portion of the chill and as extending peripherally therearound. The edges 8 of the side portions 5 of the chill ring are shown as rounded off or bevelled so as to facilitate the telescoping action of the pipe sections with the chill ring.

In Figure 2 the chill ring 4 is shown as having an open joint 9 between its adjacent ends, the joint extending at an angle A to a line T extending tangentially of the ring. By increasing the angle A the distance D, representing the length of the opening 9 with respect to the flow of any material therethrough may be likewise increased. The width W of the space 9 is chosen with respect to the tolerances permitted in the internal dimensions of the end portions of the pipe sections. If a pipe is $\frac{1}{32}$ in. undersize, for example, the space 9 will decrease due to the compressive action exerted on the chill ring by the pipe, while if the pipe is, for example, $\frac{1}{32}$ in. oversize, the resiliency of the chill ring will tend to expand the ring against the inside wall of the pipe so as to form a tight joint between the chill ring and the inside wall of the pipe as before described.

In actual operation, a chill ring is inserted into the end of one pipe section, such as the pipe section 2, as illustrated in Figure 3. It may then be spot welded at a plurality of points 10 so as to definitely maintain the chill in position with respect to such pipe section, the spot or tack welds being so located as to permit one end of the chill ring to expand or contract as required to permit the slipping thereover of the end of the pipe section 3. Ordinarily the chill ring will be so positioned that the ends of the pipe will bear directly against opposite sides of the rib or abutment 7, thereby insuring a definite spacing of the pipe ends. This spacing having been obtained, the ends may be welded together to complete the joint as indicated in Figure 1. The distance D is such that the welding material will be cooled to such an extent before completely travelling through the space 9 that it will not project into the interior of the pipe. If special welding compositions are to be utilized, or unusually high temperatures employed, the distance may be further increased, as before explained, by increasing the angle A.

It is well known among welders and steel manufacturers that steels having different specifications, and more particularly different carbon contents, will weld differently. With a chill ring of the character herein described, it is possible by spacing the ends of the pipe a greater distance, by sliding them back slightly from the rib or abutment 7, to compensate for this difference. Where a spacing greater than the rib or abutment is desired, the spot or tack welds between the chill ring and the first pipe section will be located accordingly, and the second pipe section positioned a like distance from the opposite side of the rib or abutment.

In Figure 4 there is illustrated a slightly different embodiment of the chill ring, in which parts corresponding to parts already described are designated by the same reference characters having a prime applied thereto. In this form the joint is formed by utilizing overlapping portions 11 providing spaces 12 for expansion and contraction.

In Figure 5 there is illustrated a slightly different form of the invention in which the chill ring 14 is of the under-cut type. In other words, the diameter of the chill ring in the plane of the line a—a is greater than its diameter in the plane of the line b—b, the outer surface of the side portions 15 being shaped to form tight joints 16 with the interior surfaces of the pipe ends as the resiliency of the ring causes the same to expand outwardly thereagainst. Due to the resiliency of the ring, which may be either of the construction illustrated in Figure 2, or the construction illustrated in Figure 4, it is possible to readily slip the pipe ends over the portions of relatively larger diameter of the ring and into contact with the sides of the abutment 17. Thereafter, the ring will automatically expand into snug engagement with the inner surfaces of the pipe sections. With this form of the ring, the same procedure may be followed as that before described, the ring being initially inserted into one section and tack or spot welded in position prior to slipping the other pipe section into position. The finished joint has increased strength, due to the fact that the chill ring tends to take up some of the longitudinal stresses in the pipe joint due to the inclination of the contacting surfaces 16.

In Figure 6 there is illustrated a modified form of joint which includes a chill ring 18 having pipe contacting portions 19 and an intermediate rib or abutment 20. Intermediate the seats 19 and the abutment 20 the ring is formed with grooves or depressions 21 forming spaces between the ring and the interior pipe surfaces. Such a space may be advantageous in the reception of foreign material which may come into the joint by having stuck to the pipe, or by falling thereon during the assembling operation. The space provides a collection reservoir for the foreign material, thereby permitting the pipe to contact firmly with the seats on the chill ring.

In the embodiment of the invention illustrated in Figure 7 there is utilized a chill ring 22 providing side contact zones 23. The inner ends of the pipe sections are partly supported on the inclined side walls of the abutment 24, thus providing two points of contact for each pipe section, which points of contact are separated by spaces 25 serving the function heretofore explained.

While the rings utilized in all forms of the invention except that illustrated in Figure 5 may be of solid construction, they are preferably of split construction as described, in order to give the rings not only sufficient resiliency to automatically compensate for permissible tolerances, but to also cause the rings to firmly engage the inner walls or surfaces of the pipe sections adjacent the ends thereof and thus preclude possibility of the welding material working inwardly between the ring and the pipe.

The chill rings are also herein illustrated as being of such cross sectional contour as to permit the same to be easily produced by a rolling operation in lengths which can be subsequently cut into individual pieces and shaped as required. The use of a split ring further obviates any necessity of joining the ring ends, in addition to giving the advantages previously set forth.

In all cases the rings will be preferably formed with side portions having rounded, tapered, or bevelled edges, as described, to facilitate the assembling operation. The maximum outside diameter of the chill rings at the edges will in all cases preferably be less than minimum internal diameter of the pipes with which the rings are utilized, whereby initial insertion of the rings into position is facilitated.

The advantages incident to the present invention will be apparent to those skilled in the art, from the foregoing description taken in connection with the drawings forming a part hereof. It will be understood, however, that changes in the construction, operation and location of the parts may be made without departing either from the spirit of the invention or the scope of my broader claims.

I claim:

1. In a method of forming pipe joints, the steps comprising assembling a resilient chill ring within a pipe section, forming spot welds between the ring and the end of the pipe section to secure the ring and section against relative movement, assembling a second pipe section on the chill ring, and welding the ends of the pipe sections together.

2. In a method of forming pipe joints, the steps comprising assembling a pipe section and a resilient chill ring together, forming spot welds therebetween about a portion only of their periphery to prevent relative axial movement therebetween without precluding contraction of the ring, assembling a second pipe section on the chill ring, and thereafter welding the pipe sections one to the other and to the ring.

3. In a method of forming pipe joints, the steps comprising contracting a resilient chill ring, placing the ring within the end of a pipe, spot-welding the end of the pipe to the ring at intervals circumferentially thereof, again contracting the chill ring, disposing a second pipe about the contracted ring, and welding the ends of the pipes together.

4. In a method of forming pipe joints, the steps including contracting a resilient chill ring and inserting it in the end of a pipe, spot-welding the end of the pipe to the ring at intervals about a portion only of the circumference thereof to prevent relative axial movement therebetween while permitting contraction of the unattached portion of the ring, again contracting the ring, placing the end of a second pipe over the contracted ring, and welding the pipes to each other and the ring.

HENRY W. KACHEL.